United States Patent [19]

Fattal et al.

[11] Patent Number: 4,927,486

[45] Date of Patent: May 22, 1990

[54] SYSTEM FOR APPLYING LABELS TO PALLETS MOVABLE ALONG A CONVEYOR LINE

[75] Inventors: R. George Fattal, Pierrefonds; Gordon Ringrose, Pointe-Claire, both of Canada

[73] Assignee: Twinpak Inc., Dorval, Canada

[21] Appl. No.: 356,938

[22] Filed: May 24, 1989

[51] Int. Cl.⁵ .................... B32B 31/00; G05G 15/00; B65C 9/40

[52] U.S. Cl. .................................. 156/351; 156/363; 156/379; 156/384; 156/566

[58] Field of Search .............. 156/351, 363, 378, 379, 156/384, 566, 556, DIG. 49

[56] References Cited

U.S. PATENT DOCUMENTS

| | | | |
|---|---|---|---|
| 3,783,058 | 1/1974 | Solomon et al. | 156/64 |
| 3,954,542 | 5/1976 | Solomon et al. | 156/360 |
| 3,960,640 | 6/1976 | Mort, Jr. et al. | 156/351 |
| 3,970,831 | 7/1976 | Hegyi | 156/363 X |
| 4,248,655 | 2/1981 | Kerwin | 156/351 |
| 4,321,103 | 3/1982 | Lindstrom et al. | 156/351 |

Primary Examiner—William A. Powell
Attorney, Agent, or Firm—Chilton, Alix & Van Kirk

[57] ABSTRACT

A sensor senses the presence of a pallet at a label applying station on the conveyor line and a label printer/dispenser produces labels for applying to the pallet. A robot arm moves a label receiver/applier between a first position, adjacent the label printer/dispenser for receiving a label, a second position adjacent the label applying station for applying a label to the pallet, and a third position whereat a label reader, also mounted on the robot arm, reads the label. A processor controls the robot arm, the label reader and the label printer and dispenser and compares the text of the read label to determine if it is correct, and it also determines whether the label is correctly positioned.

9 Claims, 8 Drawing Sheets

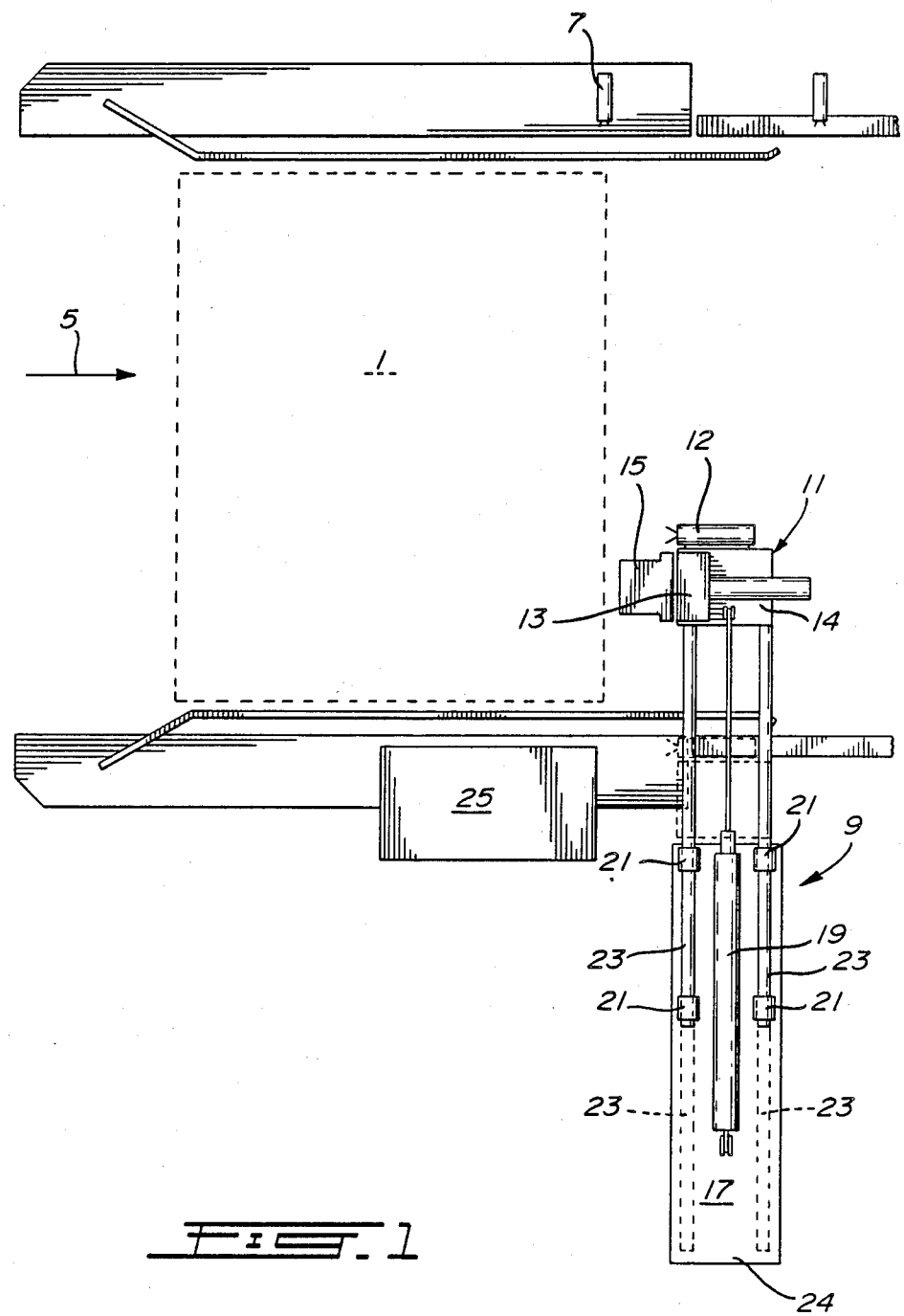

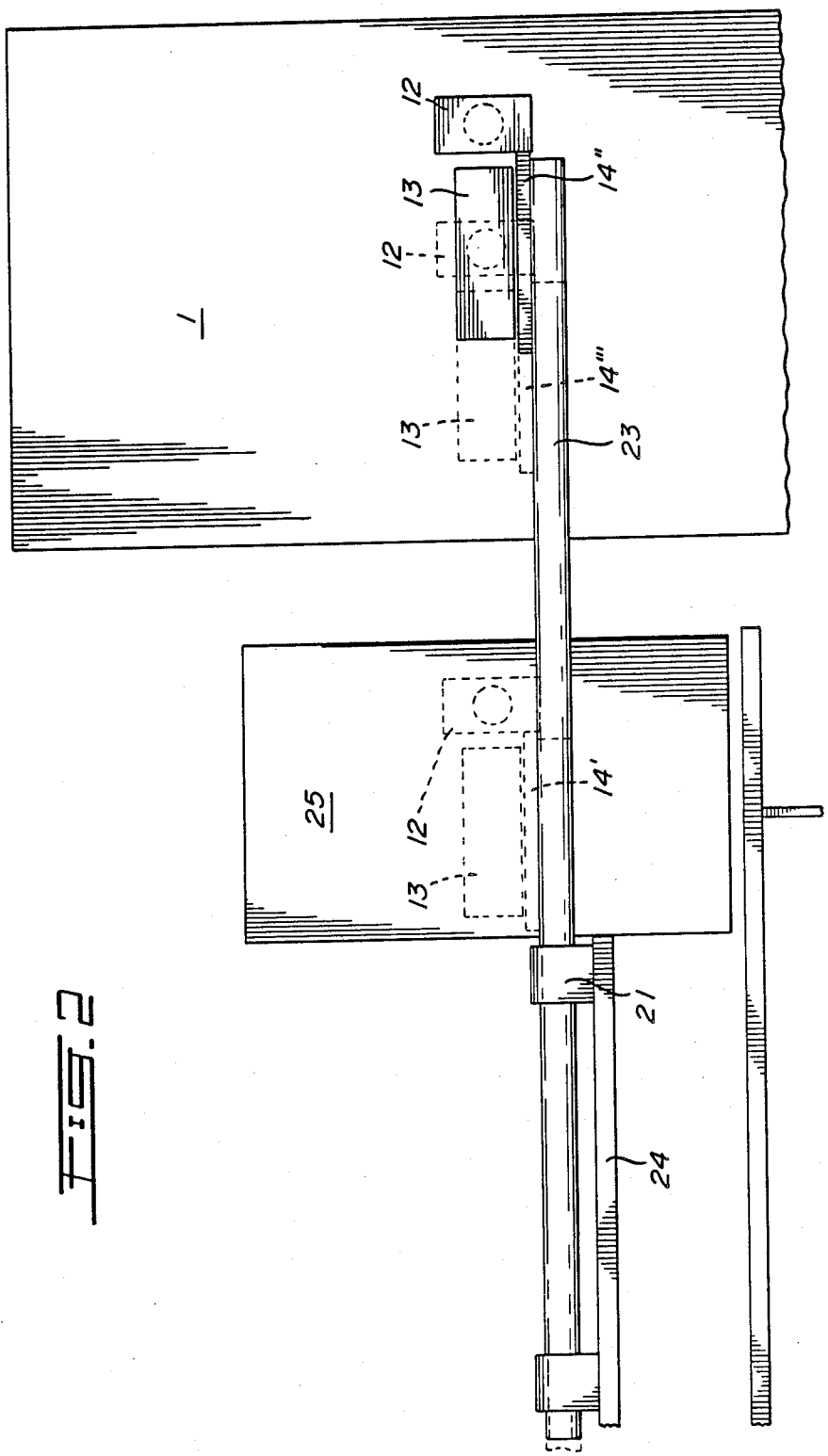

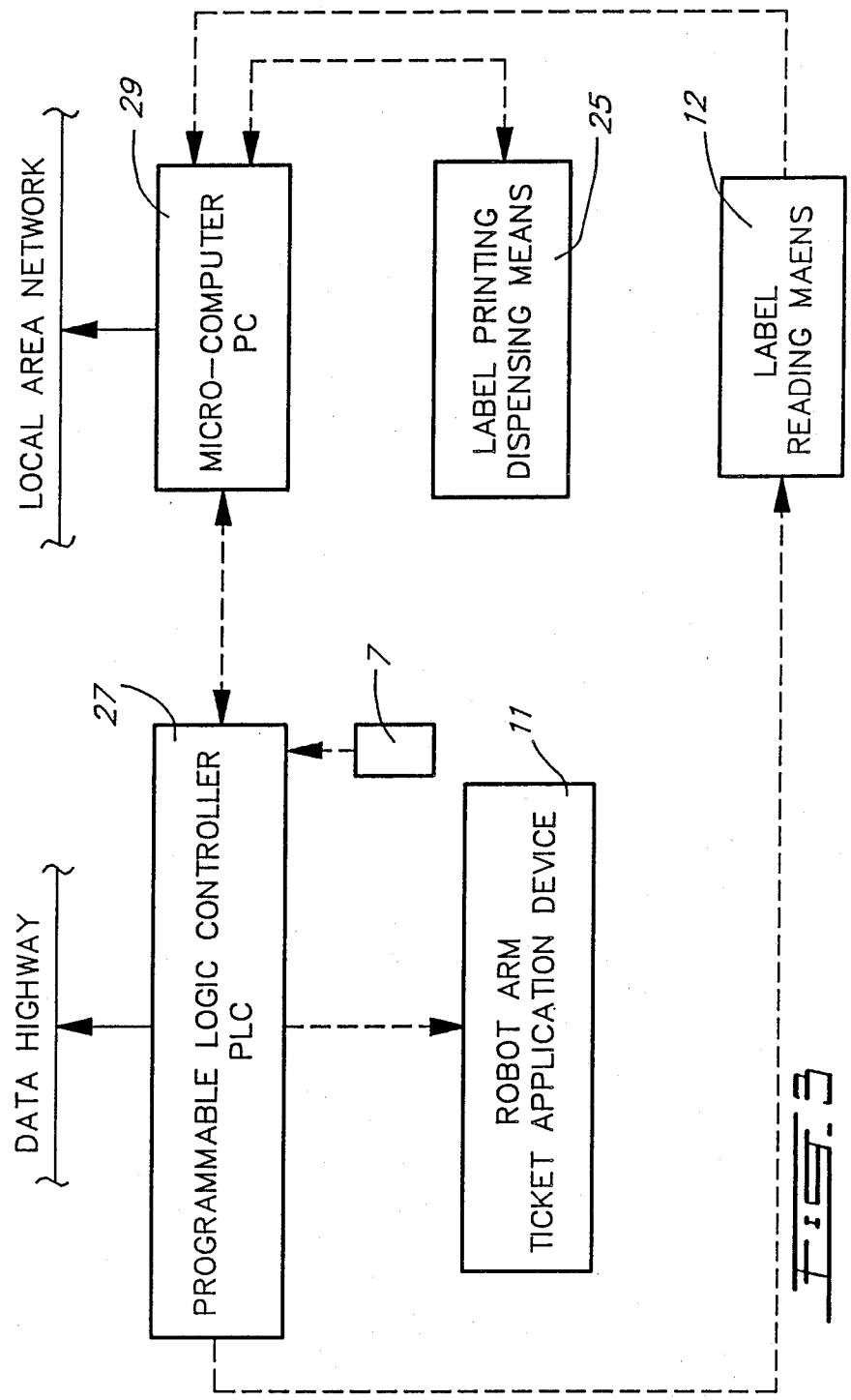

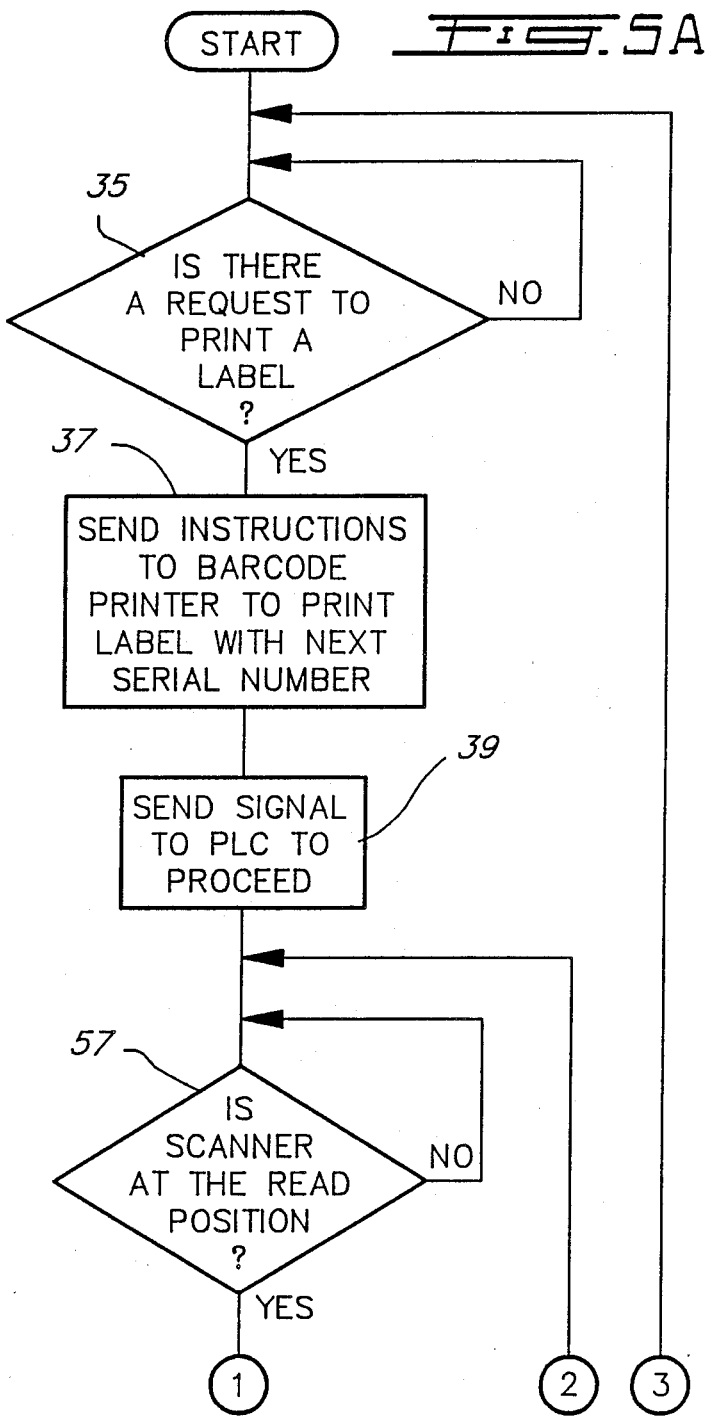

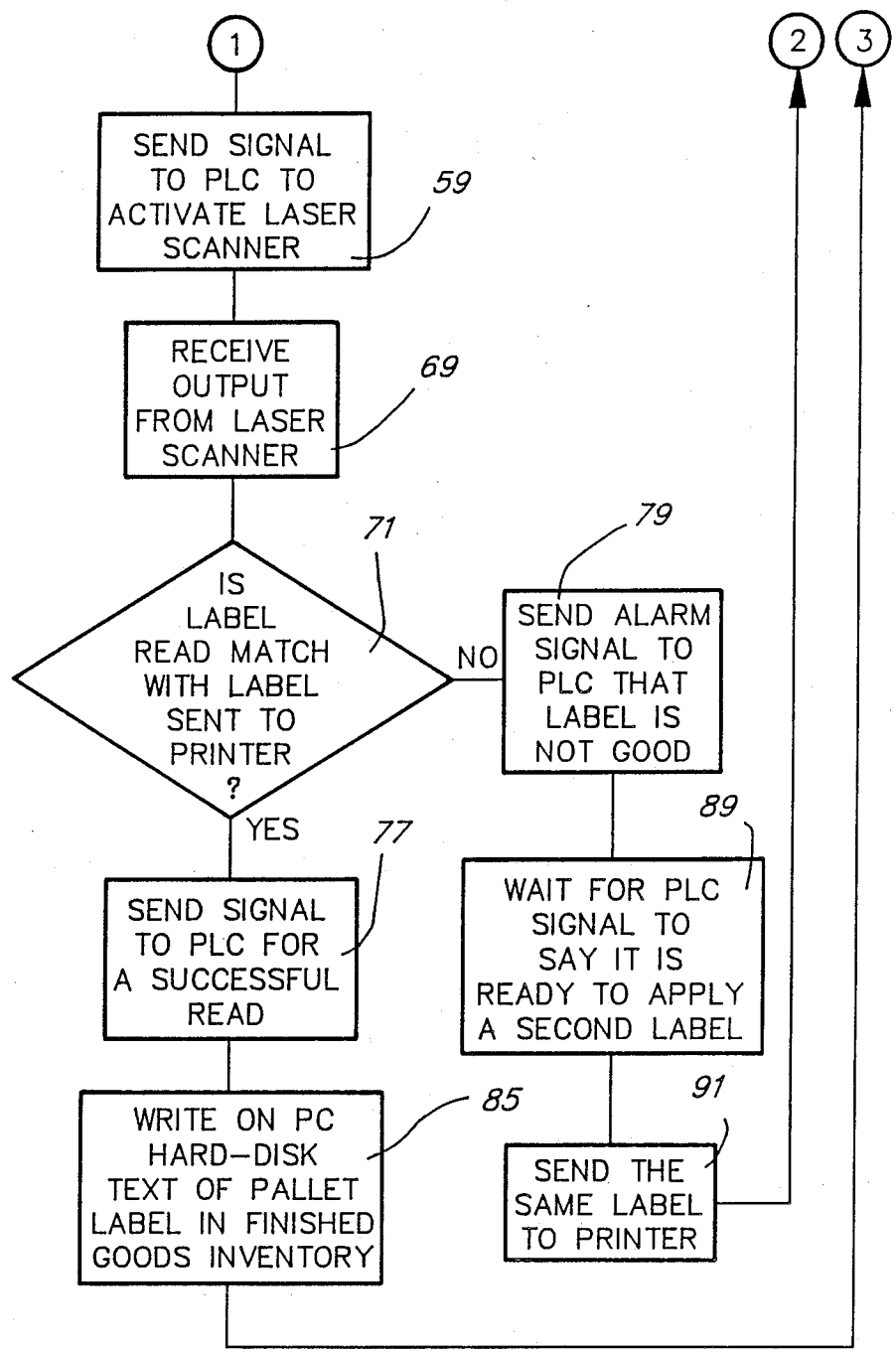

SYSTEM FOR APPLYING LABELS TO PALLETS MOVABLE ALONG A CONVEYOR LINE

BACKGROUND OF THE INVENTION

1. Field of the Invention

The invention relates to a system for applying labels to pallets movable along a conveyor line. More specifically, the invention relates to such a system which includes means for verifying the text on each label and for verifying that each label is correctly placed on the pallet.

2. Description of Prior Art

It is known in the art to provide a system for applying labels to packages which are moving along a conveyor belt. Thus, U.S. Pat. No. 4,321,103, Lindstrom et al, Mar. 23, 1982, teaches a system wherein a package is moved along a conveyor belt 10 to a weighing station which includes a computer unit 14. On the basis of the reading of the weighing unit, a label is printed in label printing and transport unit 20. The label is then moved into the nip between belts 38 and 40 to the label applying arm which includes, at the far end thereof, a roller 44. As seen in FIG. 3 of the U.S. Pat. No. '103, when the package 75 underlies the label applying arm, the roller 44 is moved downwardly to apply label 30 to the package 75.

Accordingly, it is known in the art to have a label dispenser in which a message on the label is printed on the basis of information from a computer unit. It is also known from the U.S. Pat. No. '103 to provide a means for transporting the label from the printing and dispensing unit 20 to the label applying station.

However, the U.S. Pat. No. '103 does not teach a system which verifies the message printed on the label, nor does the system as taught in the U.S. Pat. No. '103 verify that the label is properly placed on the package. In addition, the label applying system of the U.S. Pat. No. '103 is not suitable for applying labels on the front surface of a pallet movable along a conveyor line.

U.S. Pat. Nos. 3,783,058, Solomon et al, Jan. 1, 1974 and 3,954,542, Solomon et al, May 4, 1976, also teach label applying machines. Both of the Solomon et al patents also teach receiver units 351 for verifying the text and the positions of the labels. However, the system as taught in the Solomon et al patents is not at all suitable for applying labels to the front surface of a pallet movable along a conveyor line.

U.S. Pat. No. 3,960,640, Mort, Jr. et al, June 1, 1976, teaches a system for applying labels to the bottom of a product.

U.S. Pat. No. 3,970,831, Hegyi, July 20, 1976, teaches a digitizing system for programmably digitizing a control apparatus which provides control information to a machine to operate a tape placement head for the tape placement on a receiving surface. U.S. Pat. No. 4,248,655, Kerwin, Feb. 3, 1981, relates to an apparatus for controlling the positioning of indicia on a moving web. Neither of the above patents are useful for applying labels to the front end of a pallet movable along a conveyor belt.

SUMMARY OF INVENTION

It is therefore an object of the invention to provide a system for applying labels to pallets movable along a conveyor line.

It is a more specific object of the invention to provide such a system which includes means for verifying the text on each label and for verifying that each label is correctly placed on the pallet.

In accordance with the invention, the system includes a robot arm means mounting thereon a label receiving/applying means and label reading means, the robot arm means being movable between a first position adjacent a label printing/dispensing means for receiving a label from the label printing/dispensing means, a second position adjacent a label applying station on the conveyor belt for applying a label to the pallets, and a third position, for reading the applied label.

BRIEF DESCRIPTION OF DRAWINGS

The invention will be better understood by an examination of the following description, together with the accompanying drawings, in which:

FIG. 1 is a top view of the inventive system in its application on a conveyor line;

FIG. 2 is a front view of the system;

FIG. 3 is a schematic block diagram of the inventive system;

FIG. 5A and 5B constitute a flow chart of the logic of the PC in FIG. 3.

DESCRIPTION OF PREFERRED EMBODIMENTS

Figure 4A:
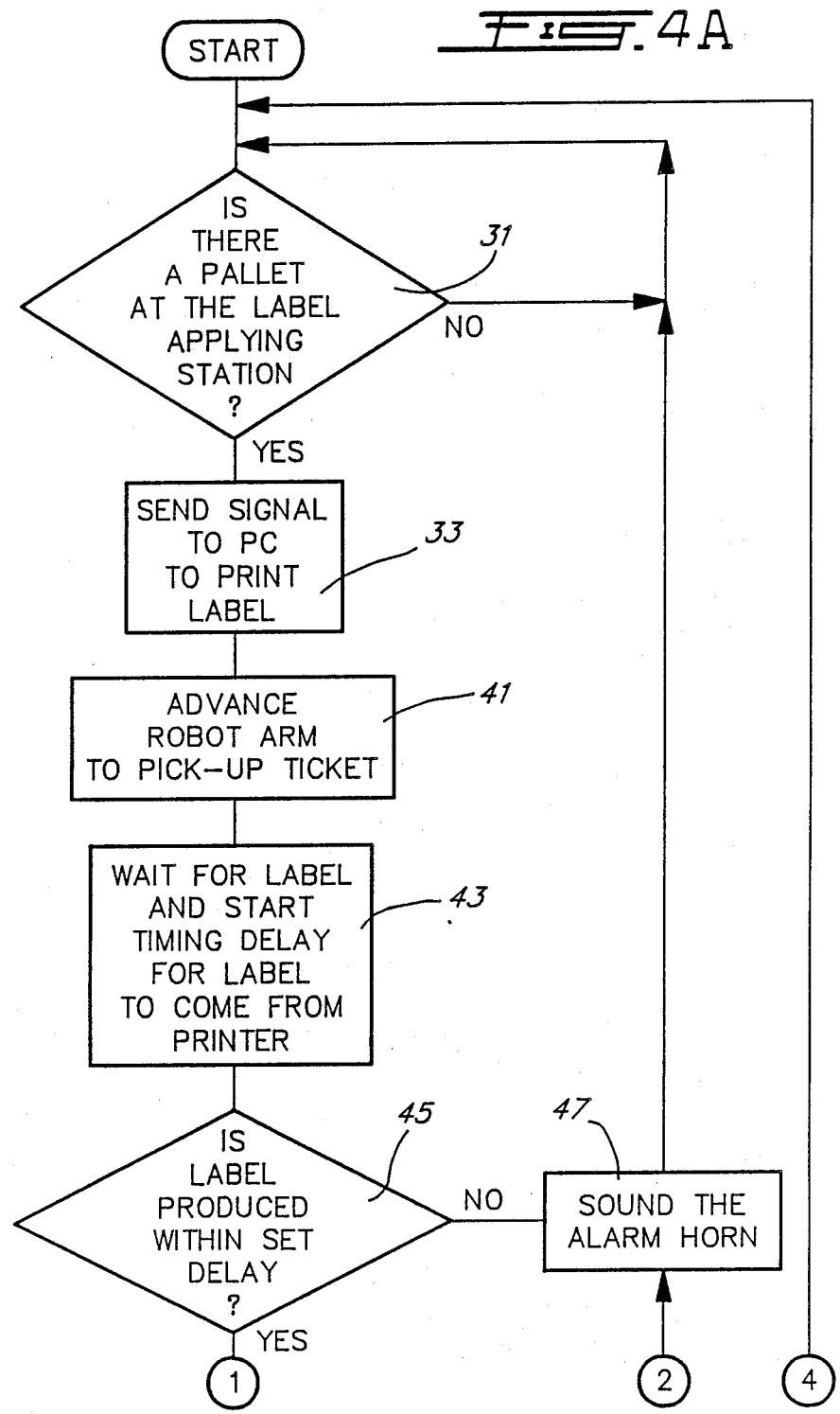
FIG. 4A, 4B and 4C constitute a flow chart of the logic of the PLC in FIG. 3.

Referring to FIG. 1, a pallet 1 to be labelled is seen to be movable along a conveyor line in the direction indicated by arrow 5. Sensor 7 senses when the front end of a pallet 1 is in the label applying station. The sensor 7 can comprise any sensing means well known in the art, for example, a mechanical switch. In a preferred embodiment, the sensor comprises an optical sensor such as a photocell.

A robot arm, indicated generally at 9, is provided to apply a label to the front end of the pallet, with label receiving/applying means 11, and to read the text on the label as well as determine that the label is correctly positioned with a reading means 12. The reading means 12 can comprise any well known means such as, for example, a camera. In a preferred embodiment, the reading means 12 comprises a laser scanner.

The label receiving/applying means comprises a piston and cylinder arrangement 13 mounted on a platform 14, and a head 15 mounted at the front end of piston and cylinder arrangement 13. The piston and cylinder arrangement moves head 15 forwardly, towards the pallet, or rearwardly, away from the pallet. It is noted that, in the illustrated embodiment, the reading means 12 is also connected to the platform 14.

The robot arm 9 also includes an arrangement 17 for moving the platform 14 laterally across the conveyor line. The arrangement 17 includes a piston and cylinder arrangement 19, which is connected to platform 14 for moving the platform 14 laterally. The platform 14 slides along slide rods 23 which are held in position by blocks 21. The robot arm arrangement is mounted on a table 24 (see also FIG. 2).

Mounted adjacent one edge of the conveyor line is a label printing/dispensing means 25.

As seen in FIG. 2, the robot arm is adapted to move the platform 14 between a first position 14' adjacent the label printing/dispensing means 25, a second position 14" at the label applying station, and a third position 14''' in the reading position.

Turning now to FIG. 3, it can be seen that, in addition to the elements already described, the inventive system also includes processors 27 and 29. Obviously, the two processors could be replaced by a single processor. However, in the illustrated embodiment, two separate processors are used.

As seen in FIG. 3, processor 27 receives the output from sensor 7, and processor 27 controls the operation of the robot arm and the laser scanner. The output of the laser scanner is fed to processor 29 which is in two-way communication with the label printing/dispensing means 25 and processor 27.

Figure 4B:
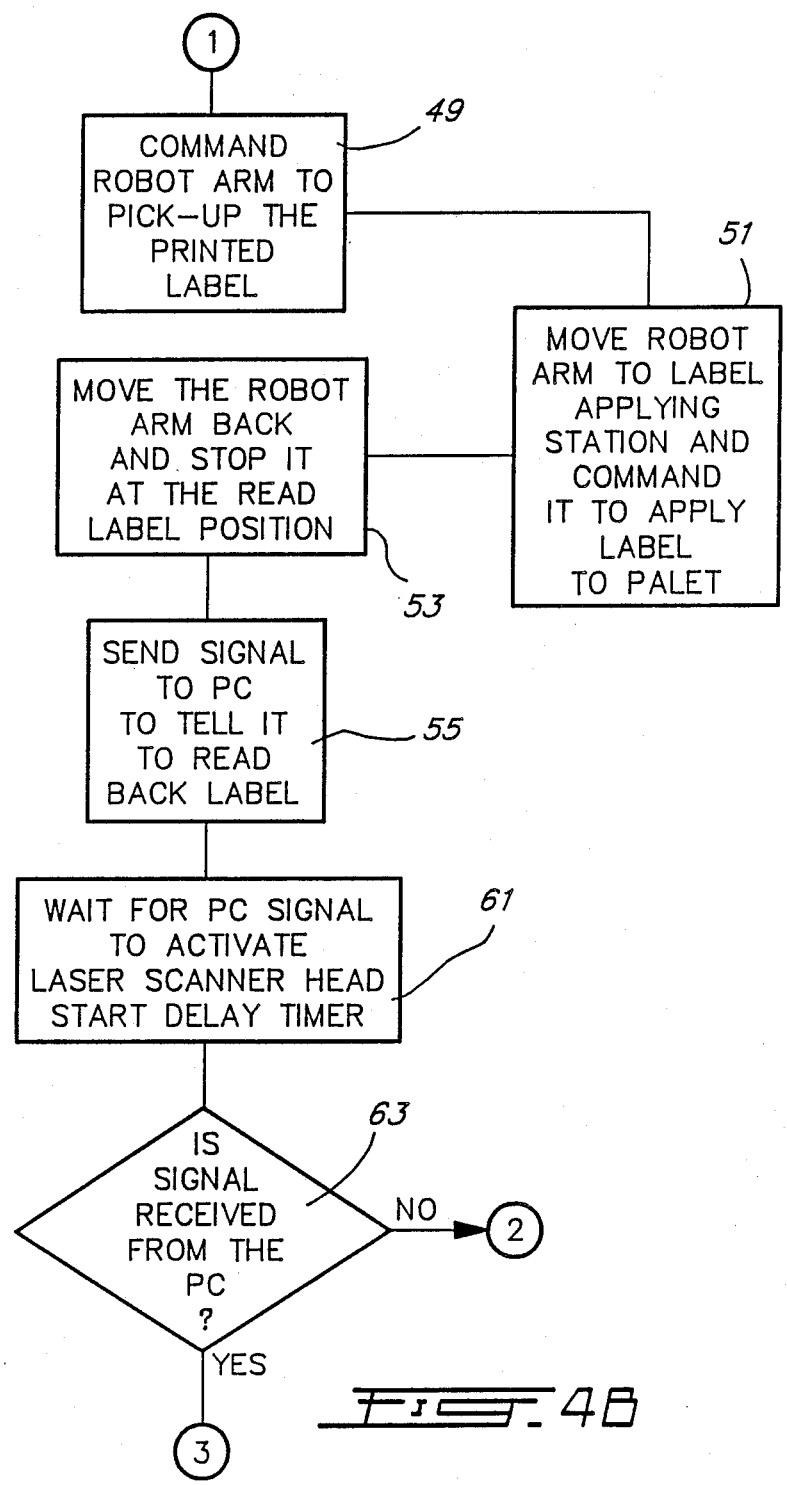
Figure 4C:
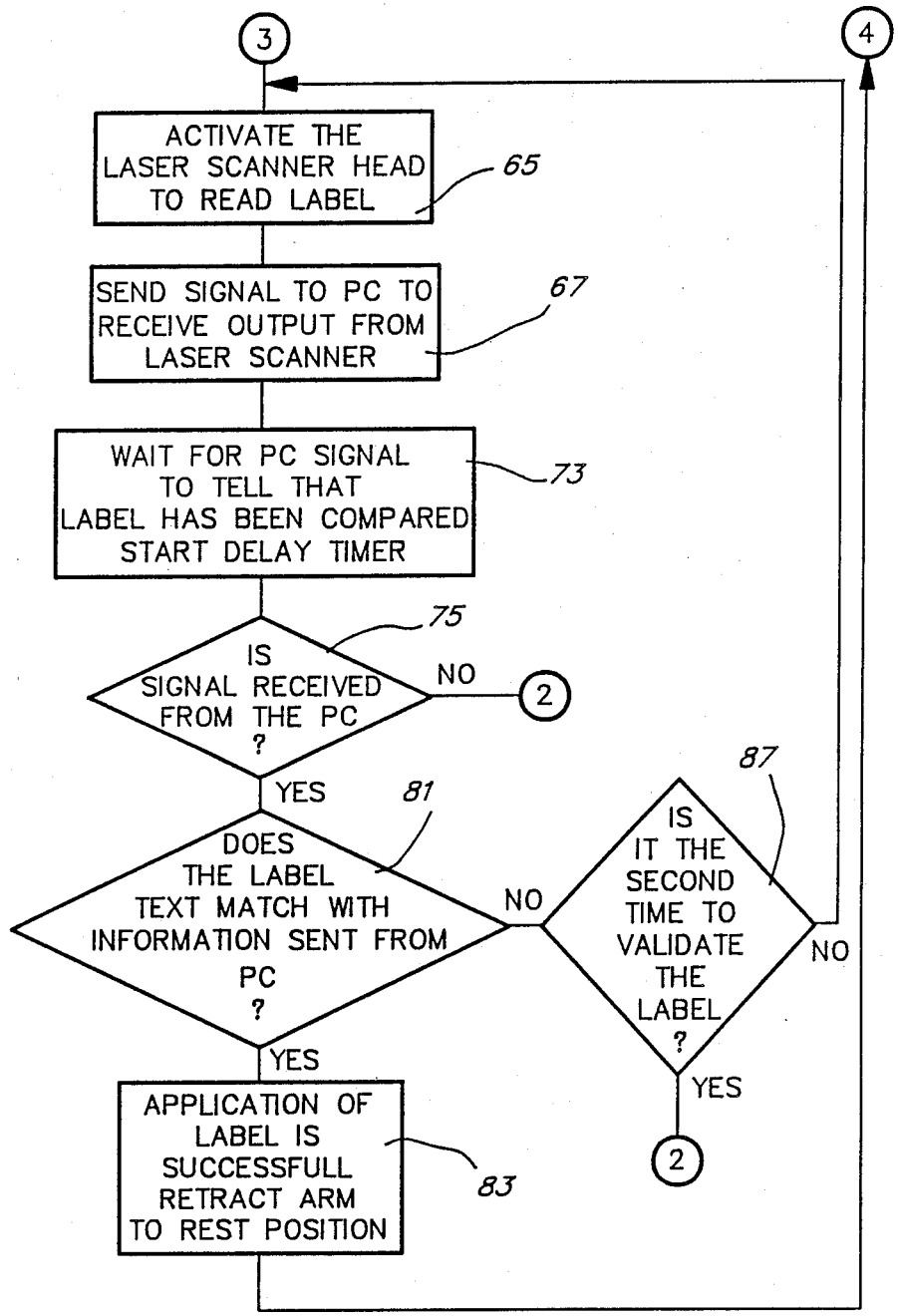

To understand the operation of the novel system, reference must be had to FIGS. 4 and 5. Referring to FIG. 4, processor 27 awaits reception from sensor 7 before it can provide a YES answer to the first decision block 31. When a signal is received from sensor 7 that a pallet is at the labelling station, a signal is sent to processor 29 (communication block 33). Processor 29 awaits such a signal before it can provide a YES answer to its first decision block 35. When such a YES answer is received, it sends instructions to the barcode printer to print the next label (communication block 37). It then sends a signal to processor 27 to proceed (communication block 39). The processor 27 then advances the robot arm to its first position adjacent label printing/dispensing means 25 (action block 41) and then waits for a signal from the label printing/dispensing means 25 that a label has been produced (action block 43).

If the label is not produced within a predetermined set period (decision block 45), an alarm is sounded and the system is turned OFF so that it can be checked by a technician (action block 47).

If the label is produced within the predetermined period, then processor 27 commands the robot arm to pick-up the printed label (action block 49) and it then commands the robot arm to move to the second position thereof (action block 51), that is, the label applying station and to apply the label to the pallet. Processor 27 then commands the robot arm to move to the third position thereof (action block 53), namely, the read position. A signal is then sent to the processor 29 (communication block 55) which is awaiting such a signal before it can provide a YES at its second decision block 57. When such a YES is provided by the second decision block 57, processor 29 sends a signal to processor 27 (communication block 59) commanding it to activate the laser scanner 12. Processor 27 is awaiting this signal (action block 61), and, on receipt of this signal, processor 27 provides a YES output from its third decision block 63 and thereupon activates the laser scanner 12 (action block 65). It then sends a signal to processor 29 (communication block 67) to receive output from the laser scanner which then receives such output (communication block 69) and compares the text of the label on the pallet with the text sent by the processor 29 to the label printing/dispensing means 25. This comparison is carried out in the third decision block 71.

Meanwhile, processor 27 is awaiting a signal from processor 29 concerning the comparison (action block 73). If such a signal does not arrive within a predetermined delay, then decision block 75 will provide a signal at its NO output whereby the alarm will be sounded (action block 47) and the system is turned OFF so that it can be checked by a technician.

Returning now to decision block 71, if there is a match between the text of the label and the text sent to the printer, and if the label is in the correct position, then decision block 71 will activate communication block 77. If the texts do not agree, or if the label is in the incorrect position, then decision block 71 will activate communication block 79.

When communication block 77 is activated, a YES output is provided from decision block 81 through decision block 75 to action block 83. Thus, the successful application of a label will cause processor 27 to retract the robot arm to its rest position, that is, its first position. At the same time, communication block 85 of processor 29 will be activated to store the text of the pallet label on the hard disk of processor 29 in the finished good inventory memory location.

When communication block 79 is activated, then a NO output is provided on decision block 81, through decision block 75, to determine if this was the first, or second, reading of the label (decision block 87). If it was the first reading, then a second label is applied, using action block 89 and communication block 91 of processor 29, and a second reading is taken. If this was a second reading, or if the second reading is incorrect, then an alarm is sounded (action block 47) and the system is turned OFF so that, once again, it can be checked by a technician.

It can also be seen that, with the successful application of a label, both the processor 27 and the processor 29 are returned to their start positions.

When the robot arm is retracted to its first position, the labelled pallet is moved out of the label applying station, and the conveyor begins to move other pallets until a further pallet is in the label applying station. At that point, the presence of a pallet at the label applying station is sensed and the entire programs in both processor 27 and 29 are run once again.

Preferably, the text on the label is a barcode as is well known in the art.

In considering the operation of the inventive system within a plant which produces a plurality of different products, the production data base defining the different products manufactured at the different production lines in the plant is initially entered into the PC which is a part of the local area network (LAN) for the plant. The PC enters in a closed loop of continuing communication with the PLC which controls the conveyor line, the robot arm and the barcode scanner.

The sequence of pallets moving on a conveyor line is stored and traced by the PLC through communications with other equipment controllers on the production line which are connected to each other via a data highway. As above described, as soon as a pallet reaches the label applying station, the sensor senses the presence of the pallet and advises the PLC which stops the conveyor line which subsequently stops the pallet. The robot arm is activated by the PLC to move it forward toward the label printing/dispensing means. When the robot arm reaches the label printing/dispensing means, the head 15 tilts and vacuum is applied to the bottom part of the head 15. Meanwhile, the PC is instructed by the PLC to activate the printing of the next label. The PC retrieves from the PLC the identity of the pallet to be labeled and, based on this information, issues a barcode label carrying the identity of the product on the pallet, number of count of the pallet, description of the product and a serial number for the pallet.

This data is then sent to the label printing/dispensing means and the label is printed. The head 15, stationary in front of the printer, picks up the incoming printed label. As soon as the outgoing side of the label reaches the bottom side of the head 15 that is under vacuum, it activates a photoeye (not shown in the drawings) mounted on the bottom of head 15 which activates through the PLC a flow of pressurized air to the adhesive side of the label and applies vacuum to the top of the head 15. This dual action of pressure and suction forces the label tightly against the head 15. At this position, another photoeye (also not shown in the drawings) mounted at the top of the head 15 activates, and the PLC readjusts the tilted head to its initial position. Then the robot arm moves away from the printer towards the pallet to apply the barcode label. During this motion, if a vacuum failure occurs causing the label to fall down, the PLC sounds an alarm asking for human assistance. The arm retracts to its first position. After the correction of the fault, the label application process is resumed by pushing a reset button on the robot arm electrical panel (not shown in the drawings) and the entire process starts again. When the arm advances and reaches the label applying station, the head moves towards the pallet and applies the label at a controlled height.

A stripping assembly (not shown in the drawings) mounted on the head 15 moves forward, stripping the printed ticket from the head and applying pressure on the pallet to hold the label tightly. Vacuum is removed shortly after the label application. Another delay is added to provide the stripping assembly enough time to push the label against the pallet. After applying the label, the arm retracts starting to return to its rest position. When the arm reacts the read position of the ticket, the PLC stops the arm motion and advises the PC that the label is ready to be read. The PC initiates the read sequence by entering into communication with the reader means 12, and it then instructs the PLC to start activating the reader means 12 to read the label.

The angle of the beam, distance, plus the lighting and reflection on the label are key factors for a successful label reading. Once the label is read by the means 12, its contents are communicated to the PC. The PC validates the label by comparing what was originally printed on the label with what was read back by the reading means 12, and most importantly, that the ticket was affixed to the pallet in the correct position for subsequent automatic reading of the coded information.

If a match occurs, an acknowledgement signal is sent to the PLC announcing this successful match. The signal resumes the motion of the arm tack to its rest position and the validated label is recorded on the LAN server as a good pallet in physical inventory enabling any station on the LAN to be updated in line with the physical inventory of the finished product. If no match is encountered, due to a damaged label, a misaligned label or a faulty label, the PC sends a "not acknowledged" signal to the PLC which reinitiates a second read sequence.

When two "not acknowledged" signals are sent to the PLC, the PLC activates an alarm for human assistance and the robot arm retracts to its first position.

Once corrected, the process is resumed by pushing on the reset button on the robot arm electrical panel. If a failure of communication between the PC and the label printing/dispensing means, or the PC and the label reading means, or between the PC and the PLC is detected by the PLC, the conveyor line is stopped and sounds an alarm for human assistance.

Provisions are made to make the system intelligent enough so that if the PC or the PLC fail for whatever reason (e.g. power failure or hardware failure), a replacement unit for the PC or PLC will resume operation from the last point it was at before failure. Any human intervention while a label is in the process of printing and validating by the PC resulting from shutting down the PC for another use or application will stop the production line. This measure is provided to ensure that a full cycle of applying labels is always completed. Restarting the PC will resume the process at the point where it was when the system went down.

Although a particular embodiment has been described, this was for the purpose of illustrating, but not limiting, the invention. Various modifications, which will come readily to the mind of one skilled in the art, are within the scope of the invention as defined in the apppended claims.

We claim:

1. A system for applying labels to pallets movable along a conveyor line, said conveyor line including a label applying station;

said system comprising:

sensor means for sensing the presence of a pallet at said label applying station;

label printing/dispensing means;

robot arm means mounting thereon label receiving-/applying means and label reading means, and including moving means for moving said robot arm means between a first position adjacent said label printing/dispensing means for receiving a label from said label printing/dispensing means, a second position adjacent said label applying station for applying a label to said pallet, and a third position for reading said applied label; and processor means, said processor means receiving inputs from said sensor means, said label printing/-dispensing means, and said label reading means, and providing controlling signals to said robot arm means, said label printing/dispensing means and said label reading means;

whereby, when said processor receives a signal from said sensor means indicating the presence of a pallet to be labelled at said label applying station, said processor controls:

(a) said printing/dispensing means to print a label in accordance with predetermined information;

(b) said robot arm to move to said first position to receive said printed label from said printing/dispensing means;

(c) said printing/dispensing means to dispense said printed label to said robot arm;

(d) said robot arm to move to said second position to apply said printed label to said pallet to be labelled; and (e) said robot arm to move to said third position to read said applied printed label.

2. A system as defined in claim 1 wherein said sensor means comprises optical sensor means.

3. A system as defined in claim 2 wherein said label receiving/applying means comprises a label receiving-/applying head, a first piston and cylinder arrangement to move said head to and from said pallet and to and from said label printing/dispensing means, said head and said first piston and cylinder arrangement all being mounted on a platform.

4. A system as defined in claim 3 wherein said moving means comprises a second piston and cylinder arrangement transverse to said first piston and cylinder arrangement, the free end of the piston of said second piston and cylinder arrangement being connected to said platform whereby to move said platform across said conveyor line, said second piston and cylinder arrangement being mounted on a table, said table also mounting slide rods, said platform being movable along said slide rods.

5. A system as defined in claim 4 wherein said reading means comprises a laser scanner mounted at one end of said platform.

6. A system as defined in claim 5 wherein said processor means comprises a personal computer (PC) and a programmable logic controller (PLC);
   said PC being in two-way communication with said PLC;
   said PC being in two-way communication with said label printing/dispensing means to control the operation of said label printing/dispensing means and to receive output therefrom;
   said PLC controlling said robot arm means and said label reading means and receiving input from said sensor means;
   whereby, when said PLC receives a signal from said sensor means indicating the presence of a pallet to be labelled at said label applying station, said:
   (a) PLC instructs said PC to instruct said label printing/dispensing means to print a label and to dispense it to said robot arm;
   (b) PLC instructs said robot arm to move to said second position and to apply said label to said pallet to be labelled at said label applying station;
   (c) PLC instructs said robot arm to move to said third position and said label reading means to read said label at said third position.

7. A system as defined in claim 6 and including alarm sounding means for sounding an alarm when said label printing/dispensing means does not produce a label.

8. A system as defined in claim 7 wherein said alarm sounding means sounds an alarm when said label reading means fails to read said label.

9. A system as defined in claim 8 wherein said alarm sounding means sounds an alarm when the text on the label is incorrect or when the label is incorrectly positioned.

* * * * *